United States Patent
Harkins (10) Patent No.: US 8,750,512 B2
(45) Date of Patent: Jun. 10, 2014

(54) AUTHENTICATING AN EPHEMERAL DIFFIE-HELLMAN USING A TRUSTED THIRD PARTY

(71) Applicant: Daniel Harkins, La Selva Beach, CA (US)

(72) Inventor: Daniel Harkins, La Selva Beach, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/661,920

(22) Filed: Oct. 26, 2012

(65) Prior Publication Data
US 2013/0111209 A1    May 2, 2013

Related U.S. Application Data

(60) Provisional application No. 61/552,810, filed on Oct. 28, 2011.

(51) Int. Cl.
H04L 9/08 (2006.01)

(52) U.S. Cl.
USPC .......... 380/270; 380/30; 380/278; 726/4; 713/155; 713/168; 713/176

(58) Field of Classification Search
CPC ........................................... H04L 9/08
USPC ............................................. 380/270
See application file for complete search history.

(56) References Cited

U.S. PATENT DOCUMENTS

| 5,915,021 | A  | * | 6/1999  | Herlin et al. ........... 705/67 |
| 8,484,469 | B2 | * | 7/2013  | Li ......................... 713/168 |
| 2003/0026433 | A1 | * | 2/2003  | Matt ...................... 380/278 |
| 2009/0063851 | A1 | * | 3/2009  | Nijdam .................. 713/155 |
| 2009/0268911 | A1 | * | 10/2009 | Singh ..................... 380/270 |
| 2010/0005307 | A1 | * | 1/2010  | Prashanth ............... 713/176 |
| 2012/0002816 | A1 | * | 1/2012  | Tian et al. ............. 380/270 |

* cited by examiner

Primary Examiner — Morshed Mehedi
(74) Attorney, Agent, or Firm — Varun A. Shah (57) ABSTRACT

Authentication of parties through a trusted intermediary is described. The standard Ottway-Rees authentication protocol is modified to provide authentication between A and B using intermediary T such that T serves only as an authenticator, and does not participate in the generation of the key shared between A and B.

24 Claims, 7 Drawing Sheets

FIG. 5B

AUTHENTICATING AN EPHEMERAL DIFFIE-HELLMAN USING A TRUSTED THIRD PARTY

RELATED APPLICATIONS

This application claims the benefit of priority on U.S. Patent Application No. 61/552,810, filed Oct. 28, 2011, the entire contents of which are incorporated by reference.

FIELD

Embodiments of the disclosure relate to the field of network authentication, and in particular, a system and method for authenticating network devices and/or their users using a trusted intermediary device.

BACKGROUND

When parties wish to communicate securely over a network, these parties must authenticate each other to ensure that they are, in fact, participating in the communications. One type of authentication protocol involves the use of a third party trusted by both the parties involved in the secure communications. The trusted third party is responsible for authenticating the parties and generating a key which is used for encrypting data sent between these parties.

Another type of authentication protocol involves network access. As an example, a client device wishes to access a network through/behind a network gateway. Since the client device is not, strictly speaking, on the network yet, it is incapable of communicating with a trusted third party residing on the network. But the client device can send data to the trusted third party through the network gateway, and the network gateway cannot modify or unwrap them. After the authentication protocol has completed, the client device and the network gateway are able to share a key that may be used to protect data communicated by users associated with their network devices.

One approach to such mutual authentication using a trusted third party may be found in "Efficient and Timely Mutual Authentication," *Operating Systems Review*, v.21 n.1, 1987, pp. 8-10 by D. Otway and O. Rees, discussed in *Applied Cryptography, Second Edition* by Bruce Schneier, pp 59-60.

Otway-Rees makes use of a trusted third party to distribute keys to two parties. While this protocol provides resistance to replay and cut-and-paste attacks, the trusted third party provides the key used by the two parties, which is considered by many to be a weakness in the networked system. Another weakness with the Otway-Rees scheme is that it does not provide Perfect Forward Secrecy (PFS), namely if the secret either party shares with the trusted third party is compromised then all past traffic can be revealed.

For instance, an example of standard Otway-Rees authentication and key generation for a client device and a gateway server through use of an intermediary device is described below.

The client device generates a nonce (Na) and chooses a session identifier (sess). Thereafter, as represented immediately below, the client device sends its identifier (A), an identifier (B) for the server, session identifier (sess) and this data {Na, A, B, sess} encrypted with a shared key ($K_{at}$) previously established between the client device A and the intermediary device T.

A→B: A, B, sess, {Na, A, B, sess}$K_{at}$, where "{ }x" denotes data protected by x Similarly, the server B generates a nonce (Nb). Thereafter, server B sends its identifier (B) along with the identifier for the client device (A), sess, the encrypted data {Na, A, B, sess}$K_{at}$ and additional data {Nb, A, B, sess} encrypted with a shared key ($K_{bt}$) previously established between the server B and the intermediary device T as represented immediately below:

B→T: B, A, sess, {Na, A, B, sess}$K_{at}$, {Nb, A, B, sess}$K_{bt}$

Based on this information, the intermediary device T generates a shared key ($K_{ab}$) for use by both client device A and server B. The shared key ($K_{ab}$) is returned to the server B, which subsequently provides $K_{ab}$ back to the client device A. More specifically, with the session identifier (sess), the shared key ($K_{ab}$) is returned to the server B as part of (i) data {Na, $K_{ab}$} encrypted with $K_{at}$, the shared key between Alice and Trent; and (ii) data {Nb, $K_{ab}$} encrypted with $K_{bt}$, the shared key between the server B and the intermediary device T. This communication is represented immediately below:

B←T: sess, {Na, $K_{ab}$}$K_{at}$, {Nb, $K_{ab}$}$K_{bt}$

Since the client device A and the intermediary device T are unable to communicate directly to each other, for the client device A to receive $K_{ab}$, a portion of a message containing $K_{ab}$ needs to pass through the server B. Thereafter, the server B sends the session identifier (sess) along with the encrypted data {Na, $K_{ab}$}$K_{at}$ to client device A as represented immediately below:

A←B: sess, {Na, $K_{ab}$} $K_{at}$

Since the server B has access to key $K_{bt}$, it can decrypt {Nb, $K_{ab}$}$K_{bt}$, verify nonce Nb, and retrieve shared key $K_{ab}$. Similarly, having access to key $K_{at}$, the client device A can decrypt {Na, $K_{ab}$}$K_{at}$, verify nonce Na, and retrieve shared key $K_{ab}$. Now, both client device A and the server B share $K_{ab}$ and can use $K_{ab}$ to communicate securely.

A perceived weakness in this exchange is that the shared key, $K_{ab}$, is generated and now also known by a third party (Trent). Another weakness, mentioned above, is the lack of Perfect Forward Secrecy that would reveal all past conversation between A and B if either $K_{at}$ or $K_{bt}$ is compromised.

What is needed is a way to use the trusted intermediary to authenticate the two parties to each other, and not operate as a key generator.

BRIEF DESCRIPTION OF THE DRAWINGS

Embodiments of the present disclosure are illustrated by way of example, and not by way of limitation, in the figures of the accompanying drawings and in which.

DETAILED DESCRIPTION

In the following description, several specific details are presented to provide a thorough understanding of the inventive aspects presented in the disclosure. While the context of the disclosure is directed to authentication of a party (e.g., network device and/or user) operating in accordance with an Ephemeral Diffie-Hellman based authentication protocol without the trusted third party performing key generation, one skilled in the relevant art may recognize, however, that the concepts and techniques disclosed herein can be practiced without certain details such as the exclusion of one or more operations, logic, or the like.

Herein, certain terminology is used to describe features and/or operations described for various embodiments of the disclosure. For example, the term "network device" generally refers to any device that includes a processor and supports wired or wireless network connectivity. Examples of network devices may include any of the following: a computer such as a tablet, a laptop, a desktop, a net book or a mainframe; a server such as a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server or a Radius™ server; a television; a content receiver; a set-top box; a video gaming console; a television peripheral such as Apple® TV; a printer; a mobile handset such as a cellular telephone supporting WiFi™, a smart phone, or a personal digital assistant "PDA"; a wireless receiver and/or transmitter; an access point; a base station; a communication management device; a router; a switch; and/or a controller.

It is contemplated that the network device may include logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage media (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" and "logic unit" are generally defined as hardware and/or software. For example, as hardware, logic may include processing circuitry (e.g., a microcontroller, any type of processor, a programmable gate array, an application specific integrated circuit, etc.), semiconductor memory, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission media (e.g., electrical, optical, acoustical or other form of propagated signals such as carrier waves, infrared signals, or digital signals).

The term "interconnect" is a communication path between two or more network devices. The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The terms "data package" and "message" identify a collection of information placed in a prescribed format. As an illustrative example, a data package may be part of a data transmission such as a packet, a frame, an Asynchronous Transfer Mode (ATM) cell, a stream of data, or the like. Similarly, a message may be a portion of the data package such as part or all of header or payload of the data package. For instance, one message type may be one or more bits of information placed in an encrypted format within the payload.

Lastly, the terms "or" and "and/or" as used herein are to be interpreted as inclusive or meaning any one or any combination. Therefore, "X, Y or Z" or "X, Y and/or Z" mean "any of the following: X; Y; Z; X and Y; X and Z; Y and Z; X, Y and Z." An exception to this definition will occur only when a combination of elements, functions, steps or acts are in some way inherently mutually exclusive.

Certain details are set forth below in order to provide a thorough understanding of various embodiments of the disclosure, albeit the invention may be practiced through many embodiments other that those illustrated. Well-known logic and operations may not be set forth in detail in order to avoid unnecessarily obscuring this description. Moreover, the illustrated embodiments of the disclosure, and the description associated therewith, should be considered as examples of the principles of the invention and not intended to limit the disclosure to those specific embodiments. It should be understood that this disclosure covers all modifications, equivalents, and alternatives falling within the spirit and scope of the disclosure.

To further describe embodiments of the disclosure, the following terms are generally defined as the following:

"Alice" represents a first party, namely a first network device (and/or its user), which is identified to other network devices and/or users by an identifier. Examples of an identifier, represented for Alice as "A", may include, but is not limited or restricted to a binary string, an alphanumeric value being a series of alphanumeric characters (e.g., numbers 0-9, lower and upper case text A-Z and a-z, or a combination thereof), a non-English characters or names, one or more graphic images, or the like. Herein, according to this embodiment in the disclosure, the first network device may be adapted to operate as a client device (e.g., a mobile telephone such as a smart phone, portable computer or tablet, etc.) by a first user.

"Bob" represents a second party, namely a second network device (and/or its user), which is identified to other network devices and/or users by an identifier. The identifier for Bob is represented herein as "B". According to this embodiment in the disclosure, the second network device may be adapted to regulate access to a network. Examples of the second network device may include, but are not limited or restricted to a server, an access point, a controller, a router, or even firewall software operating within one of these devices.

"Trent" represents a third party, namely a third network device (and/or its user), which is identified to other network devices and/or users by an identifier. The identifier for Trent is represented herein as "T". Herein, according to this embodiment in the disclosure, the third network device may be adapted to operate as a device that is trusted by the first and second network devices for authenticating communications by such devices.

The notation "{X}y" represents a message X that is wrapped (encrypted) with key y.

The notation "$g^x$ mod P" represents a public value, namely a Diffie-Hellman exponential of generator (g) raised to the power of x modulo a prime P. Herein, "x" is a random or pseudo-random value that is securely stored as a private value, and generator "g" defines a finite cyclic group in the prime field formed by P.

The notation "Nx" represents a nonce, namely a random or pseudo-random binary string sent by party "x".

The notation "sess" represents a session identifier that may be used to identify an instance of a communication protocol and the shared state that results.

The notation "X→Y" denotes that a network device X sends information to another network device Y.

Alice and Trent share a key, referred to as "$K_{at}$".
Bob and Trent share a key, referred to as "$K_{bt}$".

Both Alice and Bob can use a symmetric encryption and authentication protocol to "wrap" and "unwrap" messages using the keys they share ($K_{at}$, $K_{bt}$) with Trent.

Embodiments of the disclosure relate to methods of authenticating users through a trusted intermediary.

I. Network and Device Architecture

Figure 1A:
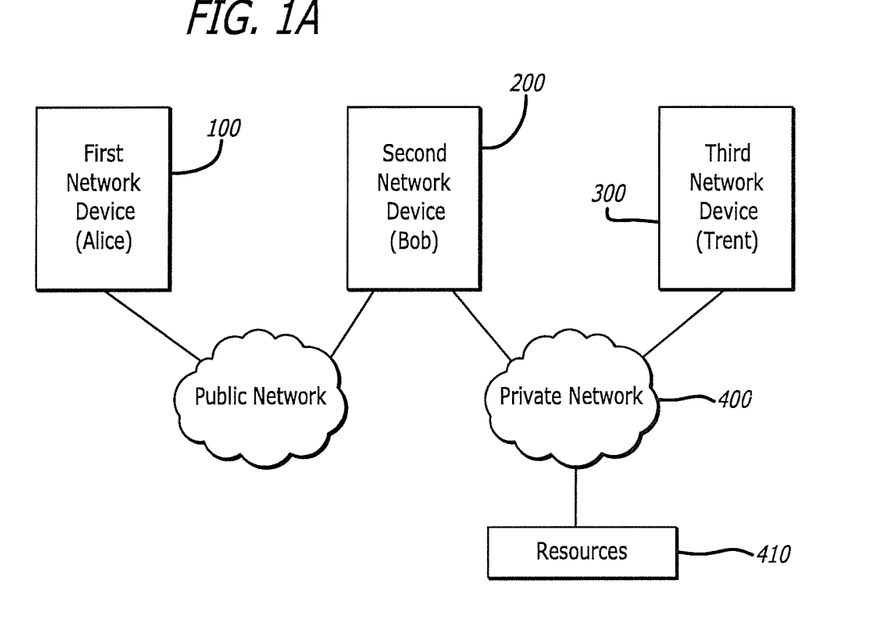
FIGS. 1A and 1B are general block diagrams of embodiments of a network operating in accordance with Ephemeral Diffie-Hellman based authentication using a trusted third party.

As shown in FIG. 1A, a general block diagram of a first embodiment of a network operating in accordance with Ephemeral Diffie-Hellman based authentication using a trusted third party (Trent) is shown. Herein, a first party 100 represented by a first network device and/or its user (hereinafter referred to as "Alice" having an identifier "A") wants access to resources 410 on network 400. Such access requires Alice 100 to initiate an access request through a second party 200 represented by a second network device and/or its user (hereinafter referred to as "Bob" having an identifier "B").

As shown, Bob 200 control communications with a trusted third party 300 (hereinafter referred to as "Trent" having an identifier "T") connected to network 400. Of course, it is contemplated that Trent 300 may be present outside of network 400 in which both Alice 100 and Bob 200 have access to Trent 300. However, Alice 100 still cannot communicate with Trent 300 directly, but rather, communications with Trent 300 via Bob 200.

Figure 1B:
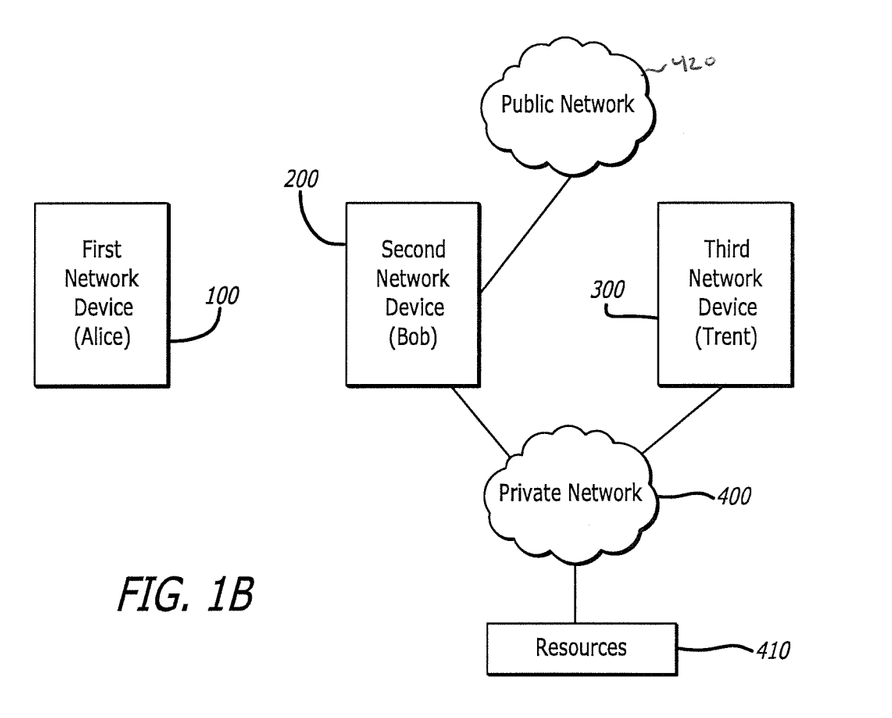

Alternatively, Ephemeral Diffie-Hellman based authentication may be used to control network access. For instance, as shown in FIG. 1B, Alice 100 may be a wireless network device requesting access to a network (e.g., private network 400 or a public network such as the Internet 420) via Bob 200. The authentication is used to ensure that Bob 200 is in communication with Alice 100 before network access is provided. This may be performed for network security or perhaps for device/user authentication for billing purposes.

Figure 2:
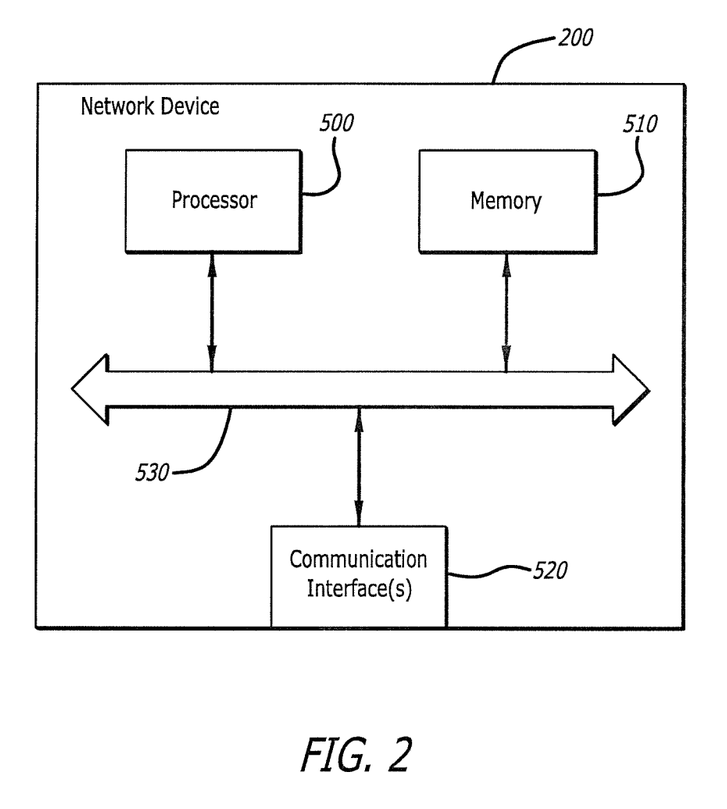
FIG. 2 is an exemplary embodiment of the general architecture of a network device, notably the second network device for the network of FIGS. 1A-1B.

As illustrated in FIG. 2, an exemplary embodiment of a network device, such as second network device 200 for example, is shown. Herein, second network device 200 comprises a processor 500, a memory (e.g., volatile and/or non-volatile memory) 510, and one or more communication interfaces 520. This logic is communicatively coupled by an interconnect 530. It is contemplated that interconnect 530 may provide a common communication path for these logic units 500/510/520 or separate, dedicated communication paths between various logic units.

A type of processor 500 used within a network device (e.g., network device 200) depends on device characteristics. For instance, as illustrative embodiments, an ARM™ processor may be used where network device 200 is a smart phone, a tablet, or the like. An IA86 style processor may be used where network device 200 is a laptop computer or a desktop computer, or a MIPS-class processor may be used in network devices such as access points, switches, controllers, servers, routers, or the like.

Communication interface(s) 520 comprises one or more wireless interfaces, operating in accordance with a particular networking standard (e.g., IEEE 802.3, IEEE 802.11, Internet Protocol "IP", etc.). Optionally, in lieu of or in addition to wireless interface(s), network device 200 may be implemented with one or more wired interfaces (e.g. IEEE 802.3 wired Ethernet interface) or one or more input/output (I/O) interfaces for receiving and/or transmitting information from a peripheral device. Examples of the peripheral device may include, but are not limited or restricted to an input device (e.g., keyboard, pointing device such as a touch screen, touch pad, mouse, keypad, etc.) and/or an output device (e.g., a display device).

Memory 510 includes non-transitory computer readable medium, such as read-write memory for program, data store and device initialization (e.g., one or more types of random access memory "RAM", flash memory, Electrically Erasable Programmable Read Only Memory "EEPROM", etc.), and/or bulk memory such as flash, solid state disk (SSD) or disc drives. Network device 200 operates under control of an operating system, with purpose-built programs providing functionality to the device. These programs are stored in portions of memory 510 of network device 200.

II. General Flowchart of the Ephemeral Diffie-Hellman Based Authentication Protocol Referring now to FIG. 3, an exemplary flowchart of the authentication operations in accordance with an Ephemeral Diffie-Hellman based authentication is shown. Herein, a public value (e.g., $g^b$ mod P, where "b" is device or user specific private information with the prime "P" and generator "g" previously agreed upon by the first and second parties) is made available to a second party (block 600). For instance, the public value may be generated by the second party or uploaded to the second party by another source.

Figure 3:
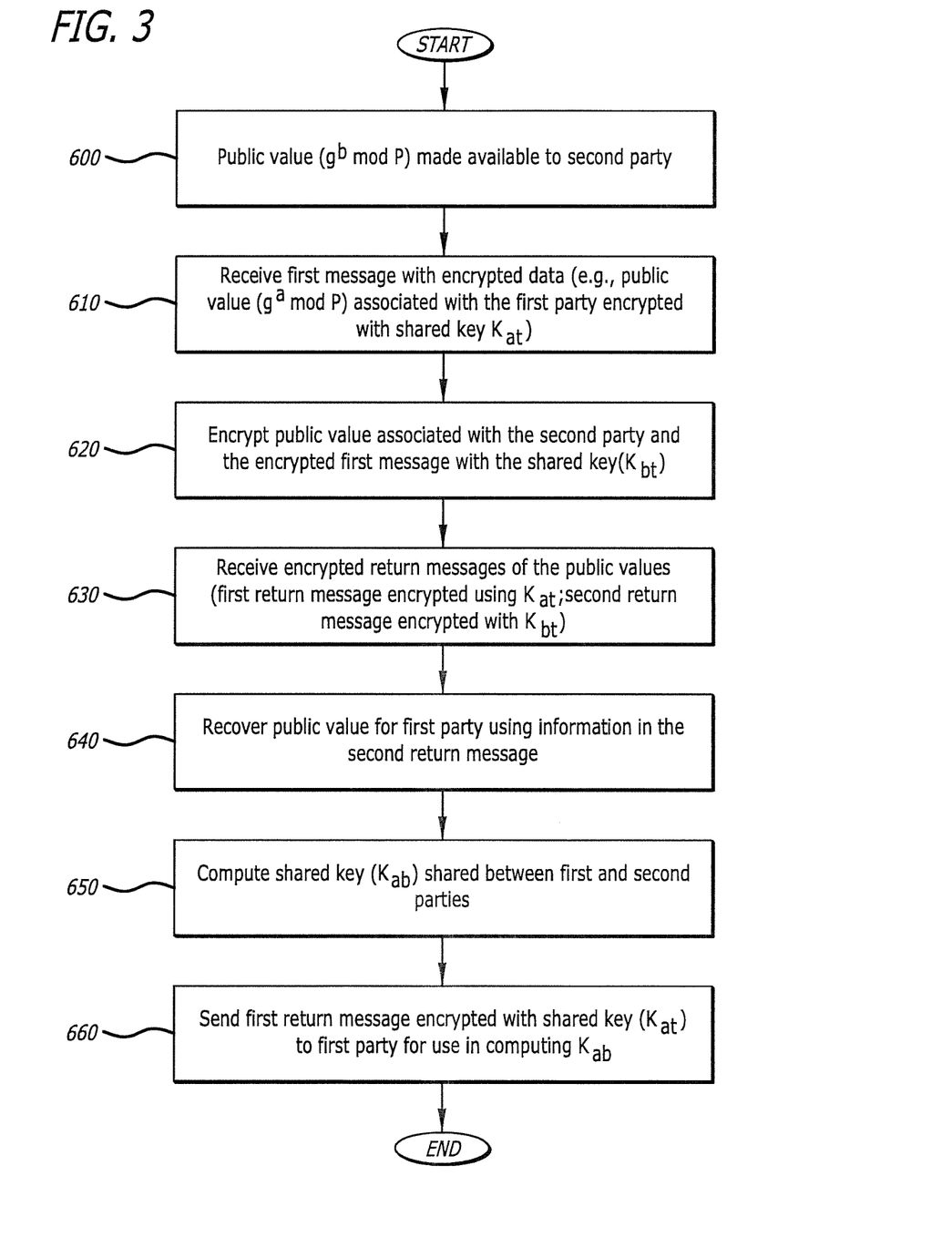
FIG. 3 is an exemplary flowchart of the authentication operations in accordance with the Ephemeral Diffie-Hellman based authentication protocol.

The second party also receives a first message with encrypted data from a first party (Alice) as shown in block 610. The encrypted data includes a public value associated with the first party that, alone or with additional authentication information such as a session identifier and/or nonce, is encrypted with a key ($K_{at}$) that is shared between the first party (Alice) and a trusted third party (Trent). According to one embodiment of the disclosure, the first public value associated with the first party (Alice) is $g^a$ mod P, where "a" is a value private to the first network device and/or its user.

After receipt of the first message, as set forth in block 620, at least the second public value ($g^b$ mod P) and the encrypted data are encrypted by a key ($K_{bt}$) that is shared between the second party (Bob) and the trusted third party (Trent). This encrypted result is transmitted to the trusted third party (Trent) for authentication of the first party (Alice) and the second party (Bob).

Thereafter, the second party (Bob) receives public values associated with both the first party and the second party ($g^a$ mod P & $g^b$ mod P), which are separately encrypted with $K_{at}$ (\{$g^a$ mod P, $g^b$ mod P\}$K_{at}$) and $K_{bt}$(\{$g^a$ mod P, $g^b$ mod P\}$K_{bt}$) as set forth in block 630. These public values may be encrypted with other authentication information, such as session identifiers and/or nonces.

By having access to shared key $K_{bt}$, second party (Bob) is able to recover the first public value ($g^a$ mod P) value and generate a key shared with the first party (Alice) as set forth in blocks 640 and 650. This shared key, $K_{ab}$, is computed by performing a modular exponentiation operation using the private value "b" of the second party and the first public value (e.g. $(g^a)^b$ mod P).

Second party (Bob) further sends the return message encrypted with $K_{at}$ (e.g., \{$g^a$ mod P, $g^b$ mod P\}$K_{at}$) to the first party as set forth in block 660. By having access to shared key $K_{at}$, first party (Alice) will be able to recover the second public value ($g^b$ mod P) from the encrypted message and generate the shared key $K_{ab}$ therefrom using the second public value and private value "a" (e.g. $(gb)^a$ mod P).

Figure 4A:
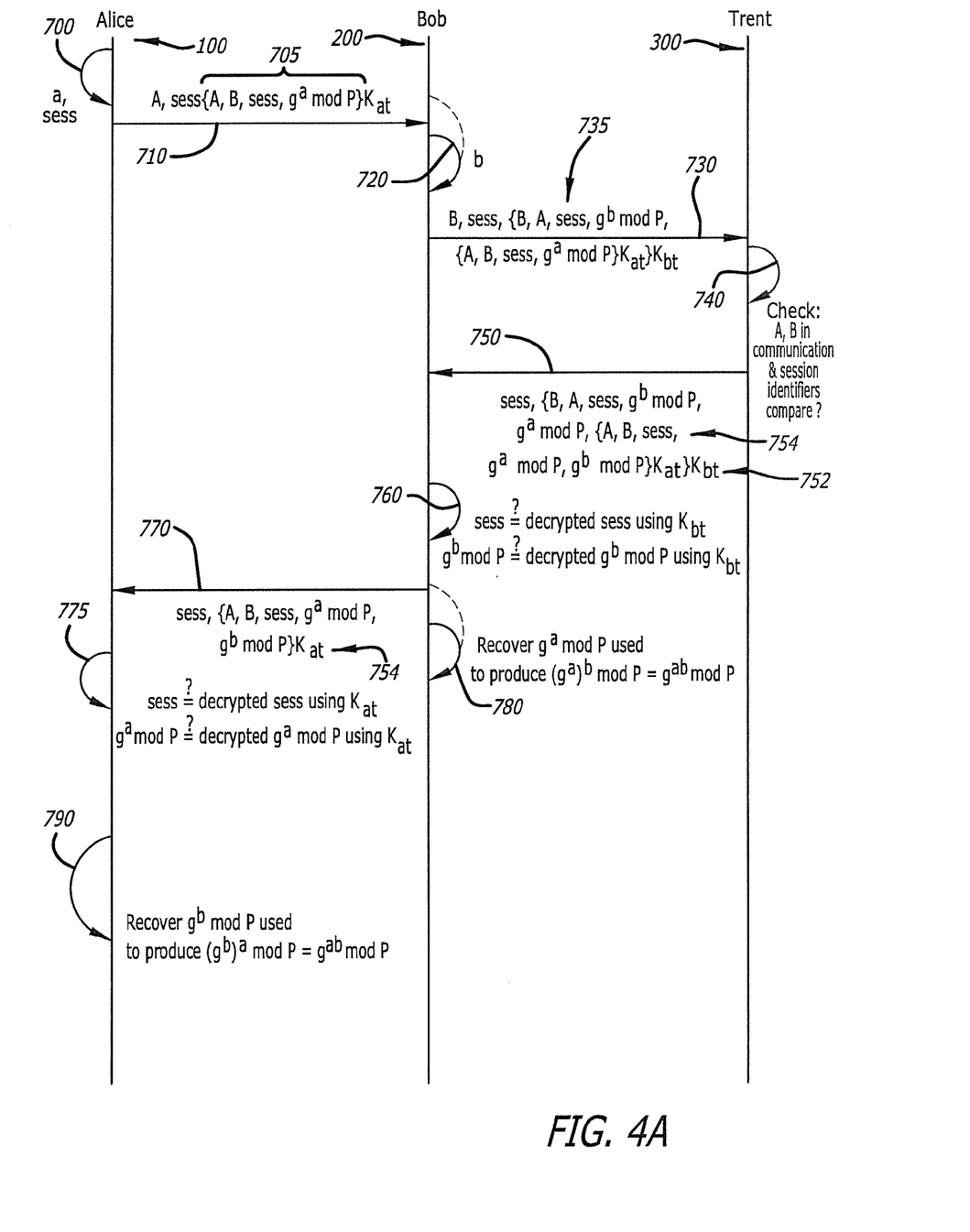
FIGS. 4A and 4B are exemplary time sequences of a first embodiment of the Ephemeral Diffie-Hellman based authentication protocol and a second embodiment of the Ephemeral Diffie-Hellman based authentication protocol using nonces for enhanced security.

III. Exemplary Embodiments of the Ephemeral Diffie-Hellman Based Authentication Protocol According to one embodiment of the disclosure, as shown in FIG. 4A, an exemplary sequence diagram of a first embodiment of an Ephemeral Diffie-Hellman based authentication protocol is shown. Initially, this embodiment begins with Alice 100 generating a private value "a". Also, session identifier (sess) may be used to identify a particular communication session that is being used for authentication (sequence 700). Sess may be generated automatically upon generating a request for access to a network via Bob 200.

Alice 100 sends to Bob 200 a first message 705 that comprises information including, but not limited or restricted to (i) an identifier (A) for Alice 100 and (ii) a first message that comprises at least identifier A, an identifier (B) for Bob 200, and a first public value. According to one embodiment of the disclosure, the first public value is a generator (g) raised to the power of "a" modulo a selected prime number "P" ($g^a$ mod P). The information within first message 705 is encrypted using a shared key ($K_{at}$) established between Alice 100 and Trent 300.

It is contemplated that additional information, such as a session identifier (sess), may be included within first message 705 and/or as part of a data package 710 for better management of the communications and avoidance of various types of attacks. Therefore, according to this embodiment of the disclosure, data package 710 comprises A, sess, and first message 705, namely {A, B, sess, $g^a$ mod P} encrypted with the shared key ($K_{at}$) between Alice 100 and Trent 300 as represented immediately below.

A→B: A, sess, {A, B, sess, $g^a$ mod P}$K_{at}$

Prior to or subsequent to receipt of data package 710, Bob 200 generates a private value "b" (Sequence 720). Bob 200 sends a second data package 730 that comprises information including, but not limited or restricted to B, sess, and a second message 735. Second message 735 comprises B, A, sess, a public value for Bob (e.g., $g^b$ mod P) and the portion of the first message 705 encrypted by $K_{at}$, where this information is encrypted with the shared key ($K_{bt}$) between Bob 200 and Trent 300. Hence, second data package 730 provided from Bob 200 may be represented as set forth below B→T: B, sess, {B, A, sess, $g^b$ mod P, {A, B, sess, $g^a$ mod P} $K_{at}$} $K_{bt}$ Upon receiving data package 730, Trent 300 confirms that communications are during the same session and originate from Alice (A) 100 and Bob (B) 200 (Sequence 740). For instance, the same session may be confirmed by determining that the session identifiers (sess) within messages 705 and 735 match, namely extracting the session identifiers (sess) from different messages 705 and 735 and comparing these identifiers. Confirmation that the two parties (A, B) are involved in the communications may be accomplished by verifying identifiers (A, B) encrypted within first message 705 and second message 735.

If no confirmation, Trent 300 sends an error message or simply provides no return messages to Bob 200. However, upon confirmation, Trent 300 returns a third data package 750 that comprises sess and a third message 752 that is encrypted with second shared key ($K_{bt}$). Third message 752 comprises: B, A, sess, $g^b$ mod P, $g^a$ mod P as well as a fourth message 754 {A, B, sess, $g^a$ mod P, $g^b$ mod P} encrypted with first shared key ($K_{at}$) as represented below:

B←T: sess, {B, A, sess, $g^b$ mod P, $g^a$ mod P, {A, B, sess, $g^a$ mod P, $g^b$ mod P}$K_{at}$}$K_{bt}$ Upon receipt of data package 750, Bob 200 verifies the information returned from Trent 300 (Sequence 760). For instance, Bob 200 may decrypt third message 752 using $K_{bt}$ to determine that the session identifier (sess) in the clear within the data package 750 matches the session identifier (sess) recovered from the third message 752. As another optional verification, a comparison may be performed to determine whether Bob's public value ($g^b$ mod P) matches the public value recovered from third message 752. As another optional verification, Bob 200 may determine that the communications are associated with Alice 100 (e.g., compare received identifier "A" with identifier "A" received from Alice 100).

In the event that the verification is not successful, Bob 200 returns an error message to Alice 100 or simply halts communications. However, upon successful verification by Bob 200, at least one Diffie-Hellman exponential ($g^a$ mod P) is recovered for shared key generation between Bob 200 and Alice 100 (Sequence 780).

Also, a portion of data package 750 is routed to Alice 100. This portion 770 may include sess, and a portion of third message 752, namely fourth message 754 encrypted with $K_{at}$, as represented below:

A←B: sess, {A, B, sess, $g^a$ mod P, $g^b$ mod P}$K_{at}$

Alice 100 decrypts fourth message 754 to determine that the session numbers match and that Diffie-Hellman exponential ($g^a$ mod P) within fourth message 754 matches its public value. If so, at least Diffie-Hellman exponential $g^b$ mod P with fourth message 754 is recovered for use as or used to generate a shared key between Alice 100 and Bob 200 as set forth below (Sequence 790).

For shared key generation between Alice 100 and Bob 200, it is noted that there is a symmetrical relationship between the Diffie-Hellman exponentials, where $(g^b \bmod P)^a = g^{ab} \bmod P = (g^a \bmod P)^b$ Now Alice knows $g^b$ mod P and "a" and can compute $(g^b \bmod P)^a = G^{ab}$ mod P. Bob knows $g^a$ mod P and "b" and can compute $(g^a \bmod P)^b = g^{ab}$ mod P. As a result, both parties can produce $g^{ab}$ mod P, which may be used, in whole or in part, as a shared key ($K_{ab}$) between Alice 100 and Bob 200 or may be used, in whole or in part, to generate $K_{ab}$.

Figure 4B:
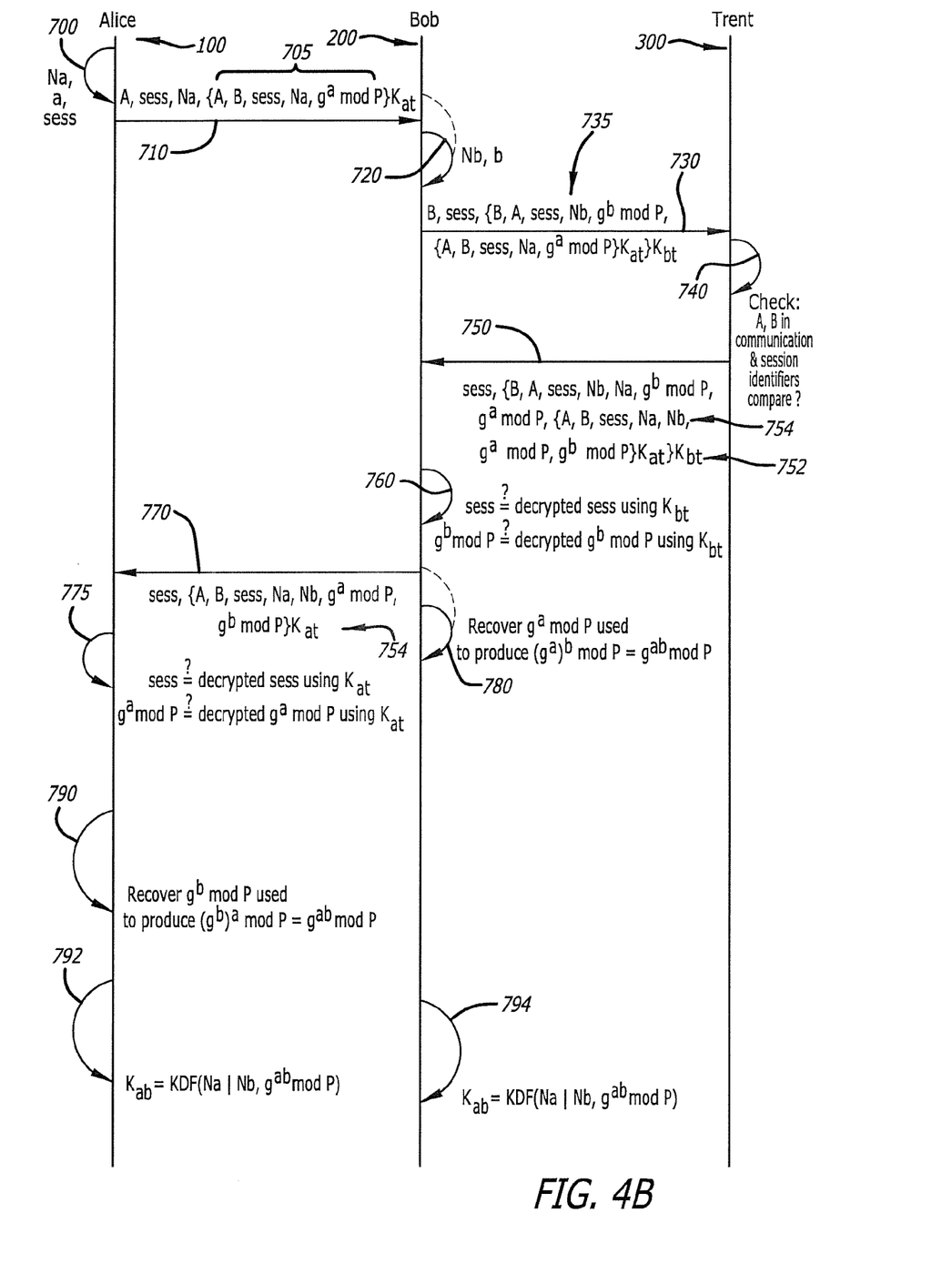

According to another embodiment of the disclosure, as shown in FIG. 4B, an exemplary sequence diagram of a second embodiment of the Ephemeral Diffie-Hellman based authentication protocol is shown. This embodiment is similar to the Ephemeral Diffie-Hellman based authentication protocol of FIG. 4A, except both Alice 100 and Bob 200 also generate nonces, "Na" and "Nb" to further avoid replay attacks and to use a random inputs to a key derivation function (KDF). These nonces are also included in first message 705, second message 735, third message 752 and fourth message 754.

Furthermore, Alice 100 and Bob 200 are adapted to use the nonces Na, Nb and the Diffie-Hellman shared secret $g^{ab}$ mod P as parameters into a shared key derivation function (KDF) to create a shared key between Alice 100 and Bob 200, namely $K_{ab}$. As shown herein, $K_{ab}$ may be a concatenation of the shared key derivation function (KDF) operating on, at a minimum the shared secret $g^{ab}$ mod P and nonces Na and Nb, to produce shared key $K_{ab}$ (Sequences 792 and 794). Any conventional key derivation function may be used as such, for instance, but not limited to, any Key Derivation Function from Special Publication 8000-108 from the U.S. National Institute of Standards and Technology (NIST), or the Extract-And-Expand Key Derivation Function (RFC 5869).

$$K_{ab} = KDF(Na|Nb, g^{ab} \bmod P)$$

While Alice 100 and Bob 200 have not technically authenticated each other, Alice 100 knows that Bob 200 created $g^b$ mod P, by Trent's assertion, and only Bob 200 can know $g^{ab}$ mod P. Similarly, Bob 200 knows that Alice 100 created $g^a$ mod P, by Trent's assertion, and only Alice 100 can know $g^{ab}$ mod P. Therefore, only the respective parties in this communication can know $K_{ab}$. Alice 100 and Bob 200 may perform a "proof-of-possession" handshake with $K_{ab}$ to finish authentication.

According to these authentication protocols, Trent 300 is removed from the role of key distributor and merely operates as an authenticator.

Figure 5A:
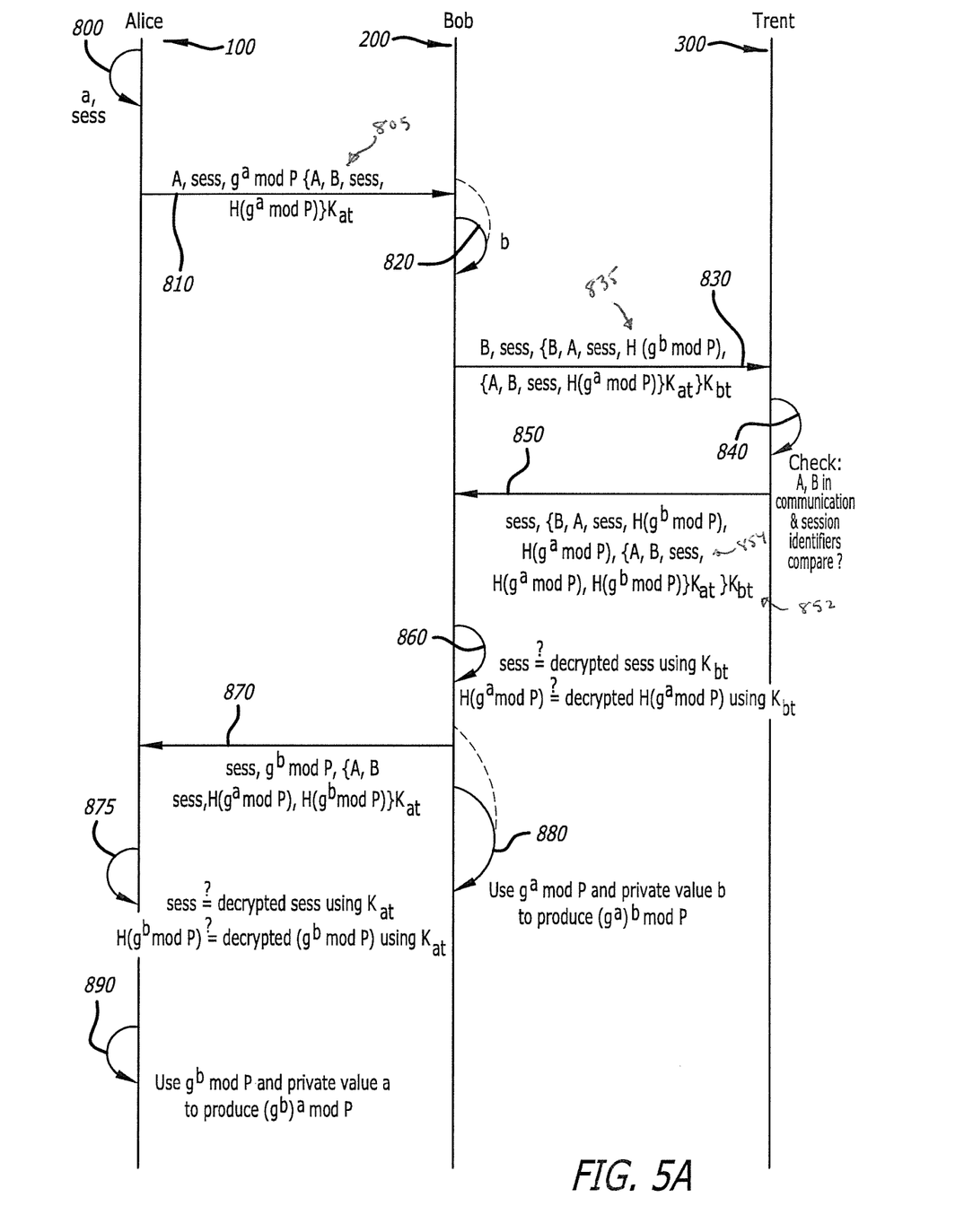
FIGS. 5A and 5B are exemplary time sequences of the third and fourth embodiments of the Ephemeral Diffie-Hellman based authentication protocol.

Referring now to FIG. 5A, another embodiment of the Ephemeral Diffie-Hellman based authentication protocol involves the use of a hash of the Diffie-Hellman exponential, $H(g^x \bmod P)$. A generalized sequence of the authentication protocol is shown below.

A→B: A, sess, $g^a$ mod P, {A, B, sess, $H(g^a \bmod P)$}$K_{at}$—
See sequence 810

B→T: B, sess, {B, A, sess, $H(g^b \bmod P)$, {A, B, sess, $H(g^a$ mod P)}$K_{at}$}$K_{bt}$—See sequence 830

B←T: sess, {B, A, sess, $H(g^b \bmod P)$, $H(g^a \bmod P)$, {A, B, sess, $H(g^a \bmod P)$, $H(g^b \bmod P)$}$K_{at}$}$K_{bt}$—See sequence 850

A←B: sess, $g^b$ mod P, {A, B, sess, $H(g^a \bmod P)$, $H(g^b \bmod P)$}$K_{at}$—See sequence 870

Upon comparison of the authentication protocol set forth in FIG. 5A with the authentication set forth in FIGS. 4A & 4B, besides using the results of a one-way hash function, there are other noted differences. For instance, upon receipt of data package 850, Bob 200 verifies the information returned from Trent 300 (Sequence 860). One optional verification scheme involves comparison of a result produced by conducting a hash operation on Alice's public value ($g^a$ mod P) received and the hash result $H(g^a \bmod P)$ of Alice's public value recovered from the third message {B, A, ... $H(g^a \bmod P)$, {A, B, ... }$K_{at}$}$K_{bt}$.

In particular, as shown in FIG. 5A, an exemplary sequence diagram of a third embodiment of Ephemeral Diffie-Hellman based authentication protocol is shown. Alice 100 generating a private value "a". Also, session identifier (sess) may be used to identify a particular communication session that is being used for authentication (Sequence 800).

Alice 100 sends to Bob 200 a first message that comprises information including, but not limited or restricted to (i) an identifier (A) for Alice 100 and (ii) a first message that comprises at least identifier A, an identifier (B) for Bob 200, and a hash result ($H(g^a \bmod P)$) produced by conducting a one-way hash operation on the first public value ($g^a$ mod P). The information within first message 805 is encrypted using the shared key ($K_{at}$) established between Alice 100 and Trent 300.

It is contemplated that additional information, such as a session identifier (sess), may be included within first message 805 and/or as part of data package 810. Therefore, according to this embodiment of the disclosure, data package 810 comprises A, sess, $g^a$ mod P, and first message 805, namely {A, B, sess, $H(g^a \bmod P)$} encrypted with the shared key ($K_{at}$) between Alice 100 and Trent 300 as represented immediately below.

A→B: A, sess, $g^a$ mod P, {A, B, sess, $H(g^a \bmod P)$}$K_{at}$

Prior to or subsequent to receipt of data package 810, Bob 200 generates a private value "b" (Sequence 820). Bob 200 sends a second data package 830 that comprises information including, but not limited or restricted to B, sess, and a second message 835. Second message 835 comprises B, A, sess, a hash result ($H(g^b \bmod P)$) produced by conducting a one-way hash operation on the second public value ($g^b$ mod P) and first message 805, where this information is encrypted with the shared key ($K_{bt}$) between Bob 200 and Trent 300. Hence, second data package 830 provided from Bob 200 may be represented as set forth below B→T: B, sess, {B, A, sess, $H(g^b \bmod P)$, {A, B, sess, $H(g^a \bmod P)$}$K_{at}$}$K_{bt}$ Upon receiving data package 830, Trent 300 confirms that the two parties (A, B) are involved in the communications and that the session identifiers (sess) within messages 805 and 835 match (Sequence 840) as described above.

Thereafter, after confirmation, Trent 300 returns a third data package 850 that comprises sess and a third message 852 that is encrypted with second shared key ($K_{bt}$). Third message 852 comprises: B, A, sess, $H(g^b \bmod P)$, $H(g^a \bmod P)$ as well as a fourth message 854 {A, B, sess, $H(g^a \bmod P)$, $H(g^b \bmod P)$} encrypted with first shared key ($K_{at}$) as represented below:

B←T: sess, {B, A, sess, $H(g^b \bmod P)$, $H(g^a \bmod P)$, {A, B, sess, $H(g^a \bmod P)$, $H(g^b \bmod P)$}$K_{at}$}$K_{bt}$ Upon receipt of data package 850, Bob 200 verifies the information returned from Trent 300 (Sequence 860). For instance, Bob 200 may decrypt third message 852 using $K_{bt}$ to determine that the session identifier (sess) in the clear within the data package 850 matches the session identifier (sess) recovered from the third message 852. As another optional verification, a comparison may be performed to determine whether a hash of Alice's public value ($g^a$ mod P) matches the hash result $H(g^a \bmod P)$ recovered from third message 852. As another optional verification, Bob 200 may determine that the communications are associated with Alice 100 (e.g., compare received identifier "A" with identifier "A" received from Alice 100).

Upon successful verification, at least one Diffie-Hellman exponential ($g^a$ mod P) is recovered for shared key generation between Bob 200 and Alice 100 (Sequence 880).

Also, a portion of data package 850 is routed to Alice 100. This portion 880 may include sess, Bob's public value ($g^b$ mod P) and a portion of third message 852, namely fourth message 854 encrypted with $K_{at}$, as represented below:

A→B: sess, $g^b$ mod P {A, B, sess, $H(g^a \bmod P)$, $H(g^b \bmod P)$}$K_{at}$

Alice 100 decrypts fourth message 854 to determine that the session numbers match and that the hash result of Diffie-Hellman exponential ($H(g^b \bmod P)$) within fourth message 854 matches a hash result of Bob's public value. If so, at least a hash result of the Diffie-Hellman exponential $H(g^b \bmod P)$ with fourth message 854 is recovered for use as or used to generate a shared key between Alice 100 and Bob 200 as set forth below (Sequence 890).

As previously mentioned, for shared key generation between Alice 100 and Bob 200, it is noted that there is a symmetrical relationship between the Diffie-Hellman exponentials, where $$(g^b \bmod P)^a = g^{ab} \bmod P = (g^a \bmod P)^b$$

Now Alice knows $g^b$ mod P and "a" and can compute $(g^b \bmod P)^a = g^{ab}$ mod P. Bob knows $g^a$ mod P and "b" and can compute $(g^a \bmod P)^b = g^{ab}$ mod P. As a result, both parties can produce $g^{ab}$ mod P, which may be used, in whole or in part, as a shared key ($K_{ab}$) between Alice 100 and Bob 200 or may be used, in whole or in part, to generate $K_{ab}$.

Figure 5B:
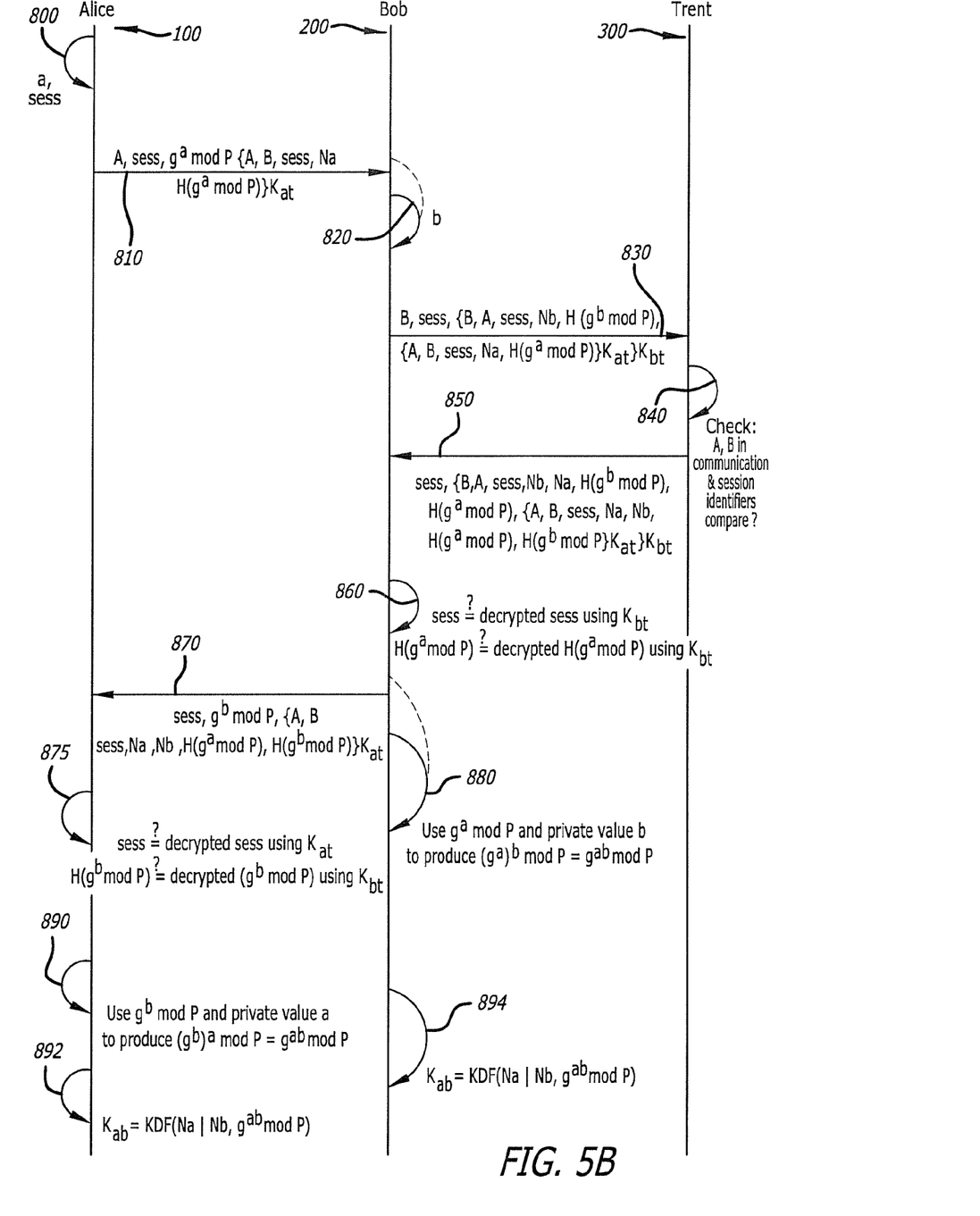

Referring now to FIG. 5B, a fourth embodiment of the Ephemeral Diffie-Hellman based authentication protocol involves the use of a hash of the Diffie-Hellman exponential, $H(g^x \bmod P)$ along with nonces generated at Alice 100 and Bob 200:

A→B: A, sess, $g^a$ mod P, {A, B, sess, Na, H($g^a$ mod P)}$K_{at}$—See sequence 810

B→T: B, sess, {B, A, sess, Nb, H($g^b$ mod P), {A, B, sess, Na, H($g^a$ mod P)}$K_{at}$}$K_{bt}$—See sequence 830

B←T: sess, {B, A, sess, Nb, Na, H($g^b$ mod P), H($g^a$ mod P), {A, B, sess, Na, Nb, H($g^a$ mod P), H($g^b$ mod P)}$K_{at}$}$K_{bt}$—See sequence 850

A←B: sess, $g^b$ mod P, {A, B, sess, Na, Nb, H($g^a$ mod P), H($g^b$ mod P)}$K_{at}$—See sequence 870

In the original Otway-Rees protocol the nonce Na, Nb is used for a "liveness" proof, to ensure that Alice and Bob are on-line and took part in this exchange and their messages are not replayed by an adversary from a previous run of the protocol. As described in the embodiments of the disclosure, $g^x$ mod P or H($g^x$ mod P) takes that place. There is still a "liveness" proof. The embodiments of the disclosure imbed Alice's wrapped messages into Bob's to further bind Bob to the exchange and prevent cut-and-paste attacks. Embodiments of the present invention use the trusted third party to provide authenticity to the peer's Diffie-Hellman exponential, instead of using it as a key distributor as the standard Otway-Rees does.

The benefits of this are that the exchange generates an ephemeral key that both parties took part in generating and that no other party can know, including the trusted third party. In addition, the exchange accomplishes Perfect Forward Secrecy (PFS) because compromise of either, or both, of the shared secrets $K_{at}$ and $K_{bt}$ would not result in knowledge of the shared secret from earlier runs of the protocol.

These authentication protocols can be extended to use elliptic curve cryptography where a point on the elliptic curve acts as a generator and is multiplied by the value "a" and/or "b" to generate the public values, and each of the public values, a*G for Alice and b*G for Bob, are multiplied by the other party's private value, b*(a*G) by Bob and a*(b*G) by Alice, to produce a shared secret a*b*G.

It is to be understood that the above description is intended to be illustrative, and not restrictive. Many other embodiments will be apparent to those of skill in the art upon reading and understanding the above description. For instance, multiple secondary network devices (Bob) may be deployed where each of these network devices has responsibility in controlling access to the network. The scope of the invention should, therefore, be determined with reference to the appended claims, along with the full scope of equivalents to which such claims are entitled.

What is claimed is:

1. A non-transitory computer readable medium comprising instructions which, when executed by one or more hardware processors, causes performance of operations comprising:
   receiving, by a first device from a second device, a first message that comprises a first public value of the second device, the first public value being encrypted with a first key; transmitting, by the first device to a trusted third party, a second message that comprises the first message and a second public value, the second message being encrypted with a second key;
   receiving, by the first device, a third message encrypted with the second key, the third message comprising (a) a fourth message comprising the second public value encrypted with the first key and (b) the first public value;
   transmitting, by the first device to the second device, the fourth message.

2. The medium of claim 1, wherein the first public value is a Diffie-Hellman public value that comprises a Diffie-Hellman generator raised to a power based on a first private value associated with the second network device modulo a predetermined prime number.

3. The medium of claim 2, wherein the second public value is a Diffie-Hellman public value that comprises a Diffie-Hellman generator raised to a power based on a second private value associated with the first network device modulo the predetermined prime number.

4. The medium of claim 1, wherein the first public value is equal to $g^a$ mod P, where
   "g" is equal to a Diffie-Hellman generator.
   "a" is equal to a first private value produced for and securely stored within the second network device, and
   "P" is the predetermined prime number.

5. The medium of claim 4, wherein the second public value is equal to $g^b$ mod P, where
   "g" is equal to the Diffie-Hellman generator.
   "b" is equal to a second private value produced for and securely stored within the first network device, and
   "P" is the predetermined prime number.

6. The medium of claim 2, wherein the first message further comprises an identifier of the second network device, an identifier of the first network device and a session identifier.

7. The medium of claim 6, wherein the first message further comprises a first nonce.

8. The medium of claim 7, wherein the second message further comprises the identifier of the first network device, the identifier of the second network device, and a second nonce.

9. The medium of claim 1, wherein the fourth message further comprises an identifier of the first network device, an identifier of the second network device, a session identifier, a first nonce and a second nonce.

10. The medium of claim 9, wherein the third message further comprises the identifier of the first network device, the identifier of the second network device, the session identifier, the first nonce and the second nonce.

11. The medium of claim 10, wherein the generating of the shared key is based on the first public value, a private value stored within the first network device and inaccessible to the second network device, the first nonce and the second nonce.

12. The medium of claim 1, wherein the first public value is a Diffie-Hellman public value that comprises a Diffie-Hellman generator represented by a point on an elliptic curve multiplied by a first private value associated with the second network device.

13. The medium of claim 12, wherein the second public value is a Diffie-Hellman public value that comprises a Diffie-Hellman generator represented by a point on the elliptic curve multiplied by a second private value associated with the first network device.

14. The medium of claim 12, wherein the first public value is equal to a*G, a first point of the elliptic curve, where
   "G" is equal to the Diffie-Hellman generator, the point on the elliptic curve, and
   "a" is equal to the first private value produced for and securely stored within the second network device.

15. The medium of claim 14, wherein the second public value is equal to b*G, a second point on the elliptic curve, where
   "G" is equal to the Diffie-Hellman generator, the point on the elliptic curve
   "b" is equal to a second private value produced for and securely stored within the first network device.

16. A non-transitory computer readable medium comprising instructions which, when executed by one or more hardware processors, causes performance of operations comprising:

transmitting, by a first network device, a plurality of messages including (i) a first message that comprises a hash result of a first public value encrypted with a first key and (ii) a second message that comprises a hash result of a second public value and the first message, the second message being encrypted with a second key;

receiving, by the first network device, a third message third message that comprises the hash result of the first public value, the hash result of the second public value and a fourth message encrypted with the second key, the fourth message including the hash result of the first public value and the hash result of second public value encrypted with the first key;

transmitting, by the first network device, the fourth message to a second network device, wherein one of the hash result of the first public value and the hash result of the second public value is used to generate a shared key to secure communications with the first network device.

17. A system comprising:
at least one device;
the system being configured to perform operations comprising:
transmitting a plurality of messages including (i) a first message that comprises a first public value encrypted with a first key and (ii) a second message that comprises the first message and a second public value, the second message being encrypted with a second key;

receiving a third message third message that comprises the first public value, the second public value and a fourth message encrypted with the second key, the fourth message including the first public value and the second public value encrypted with the first key;

transmitting the fourth message to a first network device, wherein one of the first public value and the second public value is used to generate a shared key to secure communications with the first network device.

18. The system of claim 17, wherein the first public value comprises a modulo-based value, the modulo-based value includes a Diffie-Hellman generator raised to a power based on a first private value associated with the first network device modulo a predetermined prime number.

19. The system of claim 18, wherein the second public value comprises a modulo-based value includes a Diffie-Hellman generator raised to a power based on a second private value associated with the network device modulo the predetermined prime number.

20. The system of claim 17, wherein the first public value is equal to $g^a$ mod P, where
"g" is equal to a Diffie-Hellman generator.
"a" is equal to a first private value produced for and securely stored within the first network device, and
"P" is the predetermined prime number.

21. The system of claim 20, wherein the second public value is equal to $g^b$ mod P, where
"g" is equal to the Diffie-Hellman generator.
"b" is equal to a second private value produced for and securely stored within the network device, and
"P" is the predetermined prime number.

22. The system of claim 18, wherein the first message further comprises at least two of an identifier of the first network device, an identifier of the network device and a first nonce, and a session identifier.

23. The system of claim 22, wherein the second message further comprises at least two of the identifier of the network device, the identifier of the first network device, and a second nonce.

24. The system of claim 23 further comprising:
generating the shared key based on the first public value, a private value stored within the network device and inaccessible to the first network device, the first nonce and the second nonce.

* * * * *